United States Patent
Yoshimura

(10) Patent No.: US 6,359,732 B1
(45) Date of Patent: Mar. 19, 2002

(54) PLASTIC SHEET FOR REAR PROJECTION SCREENS

(75) Inventor: Osamu Yoshimura, Nakajho-machi (JP)

(73) Assignee: Kuraray Co., Ltd., Kurashiki (JP)

( * ) Notice: Subject to any disclaimer, the term of this patent is extended or adjusted under 35 U.S.C. 154(b) by 0 days.

(21) Appl. No.: 09/644,218

(22) Filed: Aug. 23, 2000

(30) Foreign Application Priority Data

Aug. 26, 1999 (JP) .......................................... 11-239381

(51) Int. Cl.$^7$ ........................ G03B 21/56; G03B 21/60; G02B 27/10
(52) U.S. Cl. ........................ 359/460; 359/457; 359/453; 359/459; 359/443; 359/620
(58) Field of Search ................................ 359/460, 457, 359/453, 455, 459, 443, 452, 456, 619, 620

(56) References Cited

U.S. PATENT DOCUMENTS

| | | | | |
|---|---|---|---|---|
| 3,893,748 A | * | 7/1975 | De Palma et al. ........... 350/128 |
| 4,083,626 A | | 4/1978 | Miyahara et al. ........... 359/453 |
| 4,439,027 A | * | 3/1984 | Shioda et al. ................. 353/77 |
| 4,531,812 A | | 7/1985 | Oguino ........................ 350/128 |
| 4,730,897 A | * | 3/1988 | McKechnie et al. ........ 350/128 |
| 4,921,330 A | * | 5/1990 | Takahashi et al. .......... 350/128 |
| 4,961,642 A | * | 10/1990 | Ogino .......................... 353/38 |
| 5,296,922 A | * | 3/1994 | Mitani et al. ................ 348/779 |
| 5,307,205 A | | 4/1994 | Ludwig, Jr. et al. ........ 359/453 |
| 5,337,179 A | * | 8/1994 | Hodges ....................... 359/443 |
| 5,432,636 A | | 7/1995 | Ishii et al. ................... 359/460 |
| 5,697,687 A | * | 12/1997 | Coleman et al. ............ 353/122 |
| 5,699,131 A | * | 12/1997 | Aoki et al. .................. 348/832 |
| 5,751,478 A | | 5/1998 | Yoshimura et al. ......... 359/453 |
| 6,088,158 A | * | 7/2000 | Kimura ....................... 359/443 |
| 6,185,038 B1 | * | 2/2001 | Yamaguchi et al. ........ 359/457 |

FOREIGN PATENT DOCUMENTS

GB     2 297 765     8/1996

\* cited by examiner

*Primary Examiner*—Russell Adams
*Assistant Examiner*—Magda Cruz
(74) *Attorney, Agent, or Firm*—Oblon, Spivak, McClelland, Maier & Neustadt, P.C.

(57) ABSTRACT

Provided is a plastic sheet for rear projection screens, which has a two or more multi-layered structure and which can be readily warped without being unfavorably swollen or waved. The plastic sheet is constructed to have a two or more multi-layered structure, in which the coefficient of linear expansion (at 20° C.) of one layer is higher by at least $1.0 \times 10^{-6}$ mm/(mm·°C.) than that of any other layer. In one embodiment of the plastic sheet, the layer of which the coefficient of linear expansion is higher than that of any other layer contains a fine particulate rubber material having a diameter of from 0.1 to 100 μm to such a degree that the rubber material content thereof is higher by at least 0.5% by weight than that of any other layer.

6 Claims, 3 Drawing Sheets

4: FRESNEL LENS SHEET

PLASTIC SHEET FOR REAR PROJECTION SCREENS

BACKGROUND OF THE INVENTION

1. Field of the Invention

The present invention relates to a plastic sheet for rear projection screens to be used in rear projection television sets, etc.

2. Description of the Related Art

Heretofore known is a rear projection sheet comprising a plurality of sheet members such as a lenticular lens sheet, a Fresnel lens sheet, a prism lens sheet, a protect shield, etc. For such rear projection screens, lenticular lens sheets having a multi-layered laminate structure are being popularized (see Japanese Patent Laid-Open No. 61120/1993, etc.). The multi-layered lenticular lens sheet improves light utilizing efficiency, as making it possible to concentrate a light-diffusing agent at its layer most adjacent to viewers. In case where an antistatic agent is added thereto, it may be in that layer most adjacent to viewers. To the multi-layered lenticular lens sheet, predetermined additives can be so added that they are well concentrated at the layers requiring them. Accordingly, the amount of the light-diffusing agent, the antistatic agent and other additives to be added to one lenticular lens sheet of that type can be reduced, and the raw material expenses for such additives can be reduced.

The recent tendency in the art of rear projection screens is toward reducing the thickness of the sheet members constituting them, for evading so-called "ghosts" to be caused by unintended reflected rays formed inside the plurality of sheet members, but such thin sheet members are readily cracked. To solve the problem, a rubber material is often added to the sheet members to improve their impact resistance.

A rear projection screen generally comprises a combination of two or more plastic sheets that differ from each other in the thickness and the material. In this, the constituent sheets must not have any space therebetween, and they are warped so as to have arched vertical sides when they are actually fitted to a television set. Briefly, the sheets are fitted to a television set with their outer peripheries being pressed against it, and they are airtightly adhered to each other owing to their elasticity. To warp the plastic sheets in that manner, in general, they are put into a warping mold and heated at a predetermined temperature. However, when two or more multi-layered plastic sheets with a rubber material of an impact resistance improver being added thereto are warped according to such an ordinary method of putting them in a warping mold followed by heating them therein, they could not be well warped to such a degree that they have no space therebetween when combined into a rear projection screen. To solve the problem, the plastic sheets will be warped in a warping mold having a smaller radius of curvature than usually. However, the method of warping plastic sheets in such a warping mold having a smaller radius of curvature is problematic in that the warped plastic sheets are locally deformed or are unfavorably swollen or waved. In addition, the warping mold having a smaller radius of curvature shall be deep and large-sized, and is therefore difficult to handle. With the warping mold of that type, the productivity of plastic sheets is extremely low.

SUMMARY OF THE INVENTION

The present invention has been made in consideration of the problems noted above, and its object is to provide a plastic sheet for rear projection screens which can be well warped in any ordinary method of warping plastic sheets not containing a rubber material, with no failure of unfavorably deformed, swollen or waved sheets.

The plastic sheet for rear projection screens of the invention that solves the problems as above has a two or more multi-layered structure, in which the coefficient of linear expansion (at 20° C.) of one layer is higher by at least $1.0 \times 10^{-6}$ mm/(mm·°C.) than that of any other layer. In one embodiment of the plastic sheet, the layer of which the coefficient of linear expansion is higher than that of any other layer contains a fine particulate rubber material having a diameter of from 0.1 to 100 $\mu$m to such a degree that the rubber material content thereof is higher by at least 0.5% by weight than that of any other layer.

The plastic sheet for rear projection screens is so warped that the layer of which the coefficient of linear expansion is higher than that of any other layer therein is concaved inside the sheet. In order that the plastic sheet can have higher impact resistance, the thickness of the layer of which the coefficient of linear expansion is higher than that of any other layer therein is preferably at least 1/20 of the overall thickness of the plastic sheet.

The plastic sheet for rear projection screens of the invention is used as a lenticular lens sheet, a Fresnel lens sheet, etc. It is also usable for any other sheet members such as a prism sheet, a protect shield and others in rear projection screens.

In these, 1 indicates a lenticular lens sheet; 2, 6 and 7 each indicate a layer having a low coefficient of linear expansion; 3 and 5 each indicates a layer having a high coefficient of linear expansion; and 4 indicates a Fresnel lens sheet.

DESCRIPTION OF THE PREFERRED EMBODIMENTS

Figure 1:
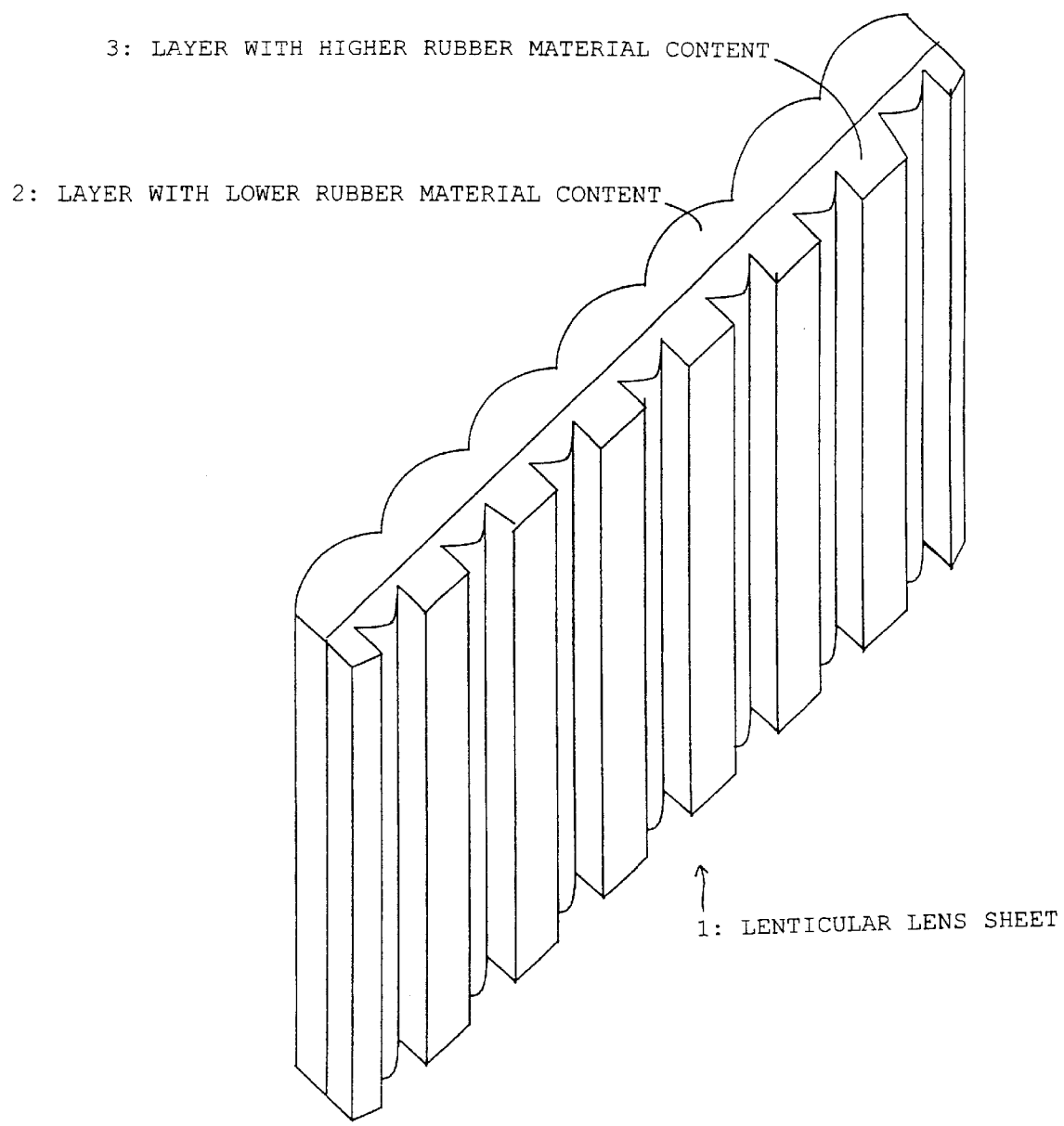
FIG. 1 is a schematic perspective view showing one embodiment of the plastic sheet of the invention for lenticular lens sheets.

One embodiment of the plastic sheet for rear projection screens of the invention is illustrated in FIG. 1 as its schematic perspective view. The plastic sheet of FIG. 1 is a lenticular lens sheet, and this has a two-layered structure of a layer 2 and a layer 3 both containing a fine particulate rubber material having a diameter of from 0.1 to 100 $\mu$m, in which the rubber material content of the layer 3 is higher than that of the layer 2. In this, the coefficient of linear expansion of the layer 3 having a higher rubber material content is higher than that of the layer 2 having a lower rubber material content. The difference in the rubber material concentration between the layer 3 having a higher rubber material content and the layer 2 having a lower rubber material content shall be determined depending on the necessary degree of warping of the plastic sheet.

For the fine particulate rubber material, employable are fine particles of synthetic rubber, concretely, multi-layered fine particles of synthetic rubber having elastic segments in the molecular chains, more concretely, multi-layered fine particles of acrylate-containing rubber, multi-layered fine particles of methyl methacrylate-butadiene-styrene rubber, etc.

The plastic sheet that constitutes the lenticular lens sheet 1 has a thickness of from about 0.5 to 1.5 mm or so. For example, it can be produced through co-extrusion of acrylic resin, acryl-styrene copolymer resin or the like by the use of two extruders. The plastic sheet is so warped that the layer 3 having a higher rubber material content (in FIG. 1, the face of the lenticular lens sheet through which light goes out) is concaved. In so warped condition, the vertical sides of the sheet (these are seen as the vertical sides also in FIG. 1) are arched in actual use of the sheet.

Adding a fine particulate rubber material to a plastic sheet for rear projection sheets for making the sheet more resistant to impact applied thereto increases the elasticity of the sheet. Even when the plastic sheet thus having such increased elasticity is warped by heating it in a warping mold, it will soon lose its warped (distorted) shape after it is taken out of the mold and therefore receives no stress from the mold. As opposed to this, in case where a plastic sheet with a fine particulate rubber material being added thereto is constructed to have a multi-layered structure in such a manner that the rubber material content of one layer of the sheet is higher than that of any other layer thereof, as in the present invention, it can be well warped by heating it not in a warping mold but on a flat hot plate, and its layer having a higher rubber material content is concaved. This is the present inventors' finding.

The reason is discussed. Of plastic layers that contain a fine particulate rubber material having a diameter of from 0.1 to 100 μm, the coefficient of linear expansion increases with the increase in the amount of the rubber material therein. In one example, multi-layered fine particles (diameter: 0.2 μm) of methyl methacrylate-butadiene-styrene rubber are added to resin substrates of the same type with varying the amount of the fine particles added thereto, and the data of the coefficient of linear expansion at 20° C., 40° C. and 60° C. of the resin substrates are obtained. The data thus obtained are given in Table 1 below.

TABLE 1

| Concentration of Fine Particles of Methyl methacrylate-butadiene-styrene Rubber in Resin Substrates [%] | Coefficient of linear expansion at 20° C. [mm/(mm · ° C.)] | Coefficient of linear expansion at 40° C. [mm/(mm · ° C.)] | Coefficient of linear expansion at 60° C. [mm/(mm · ° C.)] |
|---|---|---|---|
| 0 | $6.8 \times 10^{-5}$ | $7.0 \times 10^{-5}$ | $7.6 \times 10^{-5}$ |
| 6.4 | $8.1 \times 10^{-5}$ | $8.5 \times 10^{-5}$ | $8.9 \times 10^{-5}$ |
| 9.6 | $8.8 \times 10^{-5}$ | $9.3 \times 10^{-5}$ | $9.6 \times 10^{-5}$ |
| 12.8 | $9.5 \times 10^{-5}$ | $10.1 \times 10^{-5}$ | $11.0 \times 10^{-5}$ |

In case where a multi-layered plastic sheet in which the coefficient of linear expansion of one layer is higher than that of any other layer therein is produced through co-extrusion of resin, the layer having a higher coefficient of linear expansion in the sheet is shrunk to a higher degree than any other layer therein in the co-extrusion process in which a plurality of layers to form the sheet are, while passing through the die, melted and integrated into the sheet and the sheet thus having passed through the die is cooled. Accordingly, the sheet is so warped that its layer having a higher coefficient of linear expansion is concaved. Owing to this phenomenon, the sheet produced through co-extrusion can be naturally warped even when it is not subjected to any specific treatment in a warping mold. In order that the plastic sheet can be warped to a satisfactory degree enough for application to rear projection sheets, the difference in the coefficient of linear expansion between the layer to have a higher coefficient of linear expansion and the other layers of the sheet must be at least $1.0 \times 10_{-6}$ mm/(mm·°C.). To realize the coefficient of linear expansion difference intended for the plastic sheet, a fine particulate rubber material having a diameter of from 0.1 to 100 μm shall be added to the layers constituting the sheet in such a manner that the rubber material content of one layer of the sheet is higher by at least 0.5% by weight than that of the other layers thereof. Alternatively, a plurality of resins each having a different coefficient of linear expansion at 20° C. may be used to form a multi-layered plastic sheet, in which, therefore, the constituent layers each shall have a different coefficient of linear expansion. For example, a polyurethane resin (having a coefficient of linear expansion at 20° C. of $15.0 \times 10^{-5}$ mm/(mm·°C.)) may be used for forming the layer having a higher coefficient of linear expansion; and an acrylic resin (having a coefficient of linear expansion at 20° C. of $6.8 \times 10^{-5}$ mm/(mm·°C.)) for the layer having a lower coefficient of linear expansion.

Figure 2:
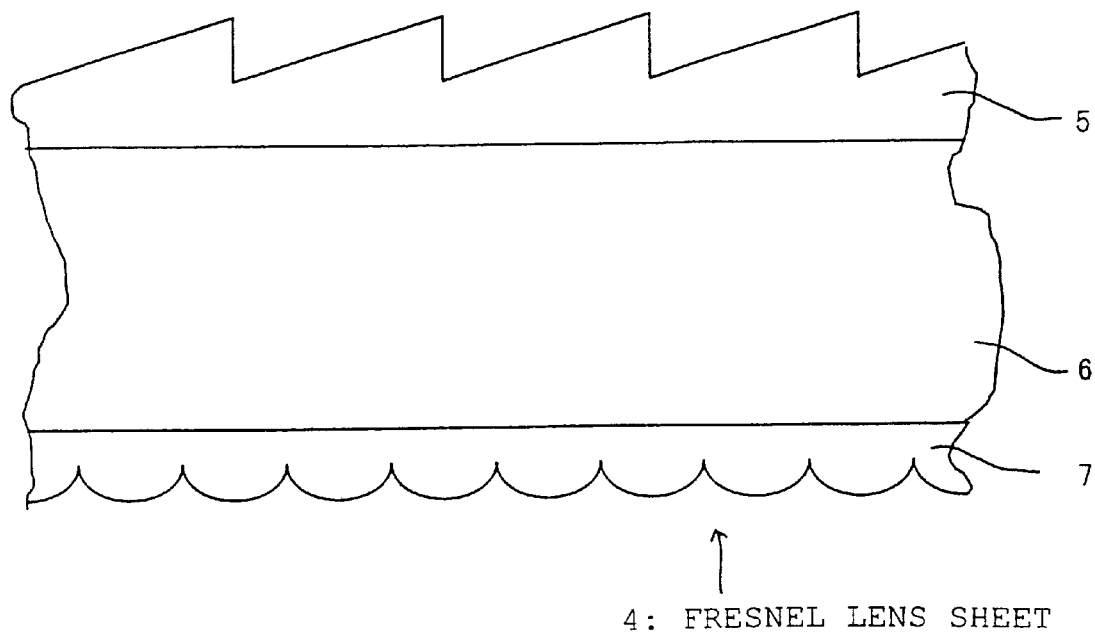
FIG. 2 is a schematic cross-sectional view showing one embodiment of the plastic sheet of the invention for Fresnel lens sheets.
Figure 3:
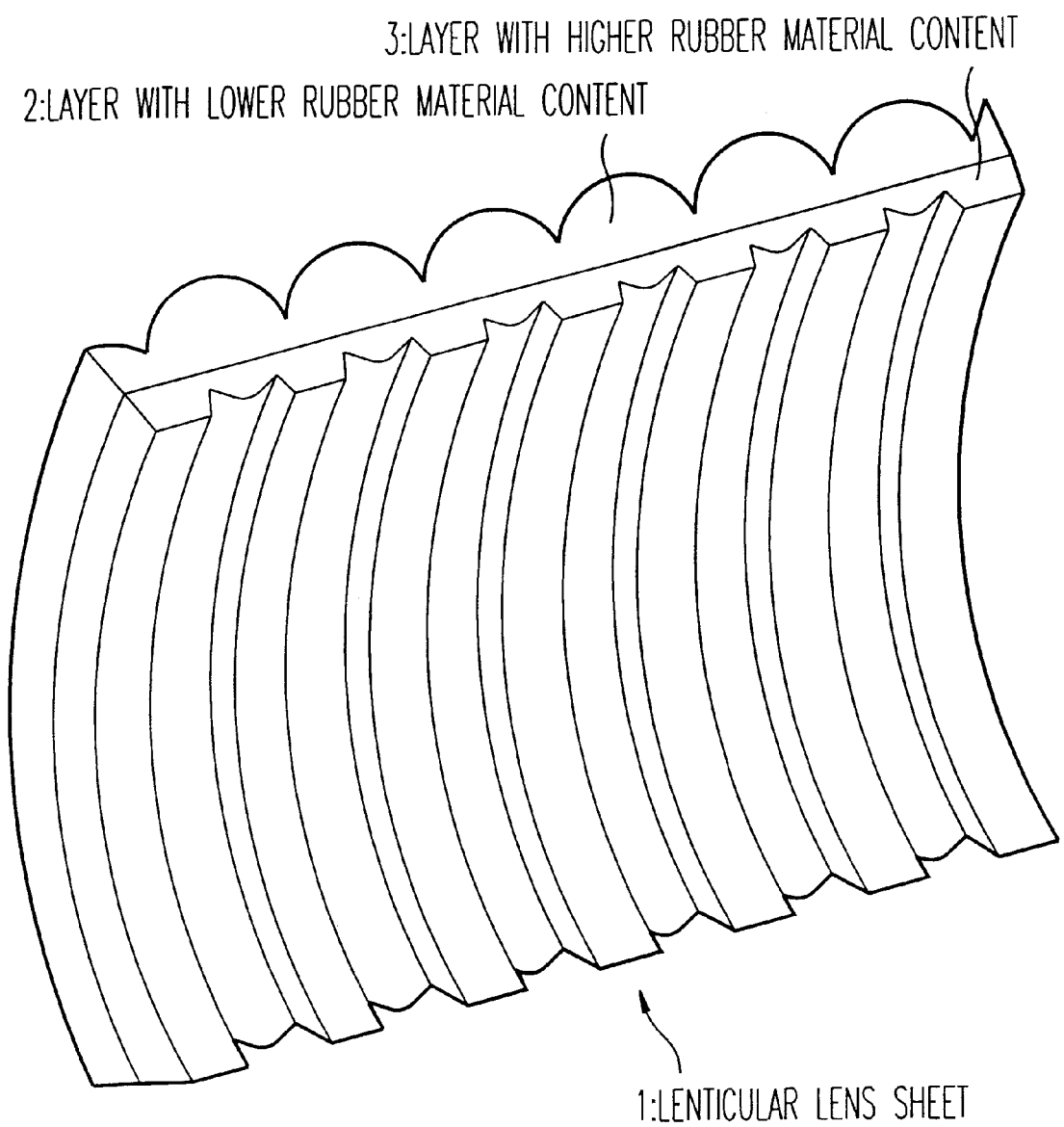
FIG. 3 is a schematic view showing a warped plastic sheet having a concaved layer according to another embodiment.

Another embodiment of the plastic sheet for rear projection screens of the invention is illustrated in FIG. 2 as its schematic cross-sectional view. The plastic sheet of FIG. 2 is a Fresnel lens sheet, and this has a three-layered structure of a layer 5 having a higher coefficient of linear expansion and layers 6 and 7 both having a lower coefficient of linear expansion. The plastic sheet illustrated has, for example, a thickness of from 0.7 to 3 mm or so, and it constitutes a Fresnel lens sheet 4. The plastic sheet can be produced, for example, by overlaying the layer 5 having a Fresnel lens pattern through photopolymerization or the like on the two-layered substrate (layer 6 and layer 7 in FIG. 2) which is formed through co-extrusion of acrylic resin, acryl-styrene copolymer resin or the like by the use of two extruders. This is so warped that the layer 5 having a higher coefficient of linear expansion (that is, the face of the Fresnel lens sheet through which light goes out) is concaved, for example, as shown in FIG. 3.

EXAMPLES

The invention is described more concretely with reference to the following Examples, which, however, are not intended to restrict the scope of the invention.

Example 1

A two-layered sheet to be a lenticular lens sheet was formed through co-extrusion of an acryl-styrene copolymer resin. To the light-entering lens layer (thickness: 0.9 mm) to be a light-entering lens, added was a fine particulate rubber material of fine particles of methyl methacrylate-butadiene-styrene (diameter: 0.2 μm), of which the amount was 5% by weight of the acryl-styrene copolymer resin. To the light-going-out lens layer (thickness: 0.1 mm) to be a light-going-out lens, added was the same fine particles of methyl methacrylate-butadiene-styrene, of which the amount was 7% by weight of the acryl-styrene copolymer resin. With the fine rubber particles being so added thereto, the two-layered sheet was formed through co-extrusion of the copolymer resin. At 20° C., the light-entering lens layer of the sheet had a coefficient of linear expansion of $7.8 \times 10^{-5}$ mm/(mm·°C.), and the light-going-out lens layer thereof had a coefficient of linear expansion of $8.2 \times 10^{-5}$ mm/(mm·°C.).

Having been extruded out through an extruder, the lenticular lens sheet had a size of 100 cm×100 cm, and all its sides were so warped that the light-going-out lens layer having a higher coefficient of linear expansion (that is, having a higher rubber material content) was concaved. Regarding the degree of warping of the sheet, the distance between the virtual line to connect the edges of the sheet and the center of the sheet was 30 mm.

Example 2

A two-layered sheet for a substrate of a Fresnel lens was formed through co-extrusion of an ordinary acrylic resin. To the light-entering layer (thickness: 0.3 mm) to be a light-entering face, added were fine particles (diameter: 0.2 μm) of an impact-resistant acrylic resin (Rohm & Haas' Ologlass DR®—this contains an impact resistance improver, fine rubber particles in an amount of 20% by weight of the base acrylic resin), of which the amount was 40% by weight of the ordinary acrylic resin. To the light-going-out layer (thickness: 1.2 mm) to be coated with a Fresnel lens by the use of a photo-resist, added was the same impact-resistant acrylic resin, of which the amount was 55% by weight of the ordinary acrylic resin. At 20° C., the light-entering layer of the sheet had a coefficient of linear expansion of $7.8 \times 10^{-5}$ mm/(mm·°C.), and the light-going-out layer had a coefficient of linear expansion of $8.1 \times 10^{-5}$ mm/(mm·°C.).

Having been extruded out through an extruder, the Fresnel lens substrate sheet had a size of 100 cm×100 cm, and all its sides were so warped that the light-going-out lens layer having a higher coefficient of linear expansion (that is, having a higher rubber material content) was concaved. Regarding the degree of warping of the sheet, the distance between the virtual line to connect the edges of the sheet and the center of the sheet was 10 mm.

Comparative Example

A two-layered sheet for a substrate of a prism sheet was formed through co-extrusion of an ordinary acrylic resin. To the light-entering layer (thickness: 0.3 mm), added were fine particles (diameter: 0.2 μm) of an impact-resistant acrylic resin (Rohm & Haas' Ologlass DR®), of which the amount was 30% by weight of the ordinary acrylic resin. To the light-going-out layer (thickness: 1.2 mm), added was the same impact-resistant acrylic resin, of which the amount was 30% by weight of the ordinary acrylic resin. With the impact-resistant acrylic resin being so added thereto, the two-layered sheet was formed through co-extrusion of the ordinary acrylic resin. At 20° C., the coefficient of linear expansion of both the light-entering layer and the light-going-out layer of the sheet was $7.5 \times 10^{-5}$ mm/(mm·°C.).

Having been extruded out through an extruder, the prism sheet had a size of 100 cm×100 cm, but all its sides were not warped. This was put into a warping mold having an extremely small radius of curvature (100 cm), and warped therein. As a result, this was warped to such a degree that the distance between the virtual line to connect the edges of the sheet and the center of the sheet was 30 mm. However, the warped sheet was not good, as being unfavorably swollen and waved.

According to the present invention described in detail hereinabove with reference to its preferred embodiments, the constitution of two or more multi-layered plastic sheets for rear projection screens can be improved, and the improved plastic sheets of the invention can be readily warped to any desired manner without being unfavorably swollen or waved. In particular, in case where the sheets are produced through co-extrusion, they can be well warped as they are, not requiring any specific treatment using a warping mold or the like.

While the invention has been described in detail and with reference to specific embodiments thereof, it will be apparent to one skilled in the art that various changes and modifications can be made therein without departing from the spirit and scope thereof.

What is claimed is:

1. A plastic sheet for rear projection screens comprising a plurality of layers, wherein the plurality of layers includes one layer having a higher coefficient of linear expansion at 20° C. by at least $1.0 \times 10^{-6}$ mm/(mm·°C.) than other one or ones of the plurality of layers.

2. The plastic sheet for rear projection screens as claimed in claim 1, wherein the one layer contains a fine particulate rubber material having a diameter of 0.1 to 100 μm and a rubber material content of the one layer is higher by at least 0.5% by weight than the other one or ones of the plurality of layers.

3. The plastic sheet for rear projection screens as claimed in claim 1 or 2, wherein the one layer has a thickness which is at least 1/20 of an overall thickness of the plastic sheet.

4. The plastic sheet for rear projection screens as claimed in claim 1 or 2, wherein the plurality of layers is warped and the one layer has a concaved form.

5. A lenticular lens sheet comprising the plastic sheet of claim 1 or 2.

6. A Fresnel lens sheet comprising the plastic sheet of claim 1 or 2.

* * * * *